United States Patent
Ratcliff

(10) Patent No.: US 9,491,365 B2
(45) Date of Patent: Nov. 8, 2016

(54) VIEWFINDER WEARABLE, AT LEAST IN PART, BY HUMAN OPERATOR

(71) Applicant: Intel Corporation, Santa Clara, CA (US)

(72) Inventor: Joshua J. Ratcliff, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 43 days.

(21) Appl. No.: 14/082,959

(22) Filed: Nov. 18, 2013

(65) Prior Publication Data

US 2015/0138417 A1 May 21, 2015

(51) Int. Cl.
| | | |
|---|---|---|
| H04N 5/222 | (2006.01) | |
| H04N 7/18 | (2006.01) | |
| G09G 5/00 | (2006.01) | |
| G02B 27/14 | (2006.01) | |
| H04N 5/232 | (2006.01) | |
| G02B 27/01 | (2006.01) | |

(52) U.S. Cl.
CPC ...... *H04N 5/23293* (2013.01); *G02B 27/0172* (2013.01); *H04N 5/232* (2013.01); *H04N 5/23296* (2013.01); *G02B 2027/0138* (2013.01); *G02B 2027/0178* (2013.01)

(58) Field of Classification Search
CPC ............... G02B 27/017; G02B 2027/0178; G02B 2027/0138; G02B 2027/014; G02B 27/0172; G02B 2027/0118; G02B 2027/0132; G02B 2027/0143; G06F 1/163; G06F 3/017; G06F 3/013; H04N 5/23293; H04N 5/23248; H04N 13/0278
USPC ....... 348/333.01–333.13, 143–160; 345/8, 7; 359/630
See application file for complete search history.

(56) References Cited

U.S. PATENT DOCUMENTS

| | | | | |
|---|---|---|---|---|
| 5,557,328 | A * | 9/1996 | Ishihama et al. | 348/240.3 |
| 5,572,343 | A * | 11/1996 | Okamura | G02B 27/017 |
| | | | | 345/8 |
| 7,675,683 | B2 * | 3/2010 | Dobson et al. | 359/630 |
| 9,323,053 | B2 * | 4/2016 | Lam | G02B 27/017 |
| 2002/0085843 | A1 * | 7/2002 | Mann | 396/374 |
| 2002/0154912 | A1 * | 10/2002 | Koseki et al. | 396/429 |
| 2005/0231599 | A1 * | 10/2005 | Yamasaki | 348/207.99 |
| 2005/0271279 | A1 * | 12/2005 | Fujimura | G06K 9/00355 |
| | | | | 382/203 |

(Continued)

OTHER PUBLICATIONS

IEEE Spectrum, "Google Glass", Aug. 7, 2013, pp. 1-6. retrieved from http://spectrum.ieee.org/geek-life/reviews/google-glass.

(Continued)

*Primary Examiner* — Chia-Wei A Chen
(74) *Attorney, Agent, or Firm* — Christopher K. Gagne

(57) ABSTRACT

A system embodiment may include at least one camera wearable, at least in part, by a human operator. The at least one camera may have, when enabled, at least one active field of view that may be captured by the at least one camera in response, at least in part, to image capture actuation by the human operator. This embodiment also may include a viewfinder wearable, at least in part, on a head of the human operator. The viewfinder may provide to the human operator, prior to the image capture actuation, at least one visual indication of the at least one active field of view of the at least one camera. The at least one visual indication may be displayed in at least one central field of vision of the human operator. Of course, many alternatives, modifications, and variations are possible without departing from this embodiment.

18 Claims, 7 Drawing Sheets

(56) References Cited

U.S. PATENT DOCUMENTS

| | | | |
|---|---|---|---|
| 2010/0007665 A1* | 1/2010 | Smith | G06T 13/40 345/473 |
| 2010/0079356 A1* | 4/2010 | Hoellwarth | 345/8 |
| 2010/0149073 A1* | 6/2010 | Chaum et al. | 345/8 |
| 2010/0166315 A1* | 7/2010 | Paquier | G06K 9/6267 382/190 |
| 2010/0188314 A1* | 7/2010 | Miyake et al. | 345/8 |
| 2010/0295783 A1* | 11/2010 | El Dokor | G06F 3/017 345/158 |
| 2011/0012814 A1* | 1/2011 | Tanaka | 345/8 |
| 2011/0213664 A1* | 9/2011 | Osterhout et al. | 705/14.58 |
| 2011/0228140 A1* | 9/2011 | Kazami | 348/240.1 |
| 2012/0068913 A1* | 3/2012 | Bar-Zeev | G02B 26/026 345/8 |
| 2012/0198353 A1* | 8/2012 | Lee | G06F 3/017 715/748 |
| 2012/0249724 A1* | 10/2012 | Morrison | G06F 3/013 348/14.16 |
| 2013/0002924 A1* | 1/2013 | Nakajima et al. | 348/333.02 |
| 2013/0021374 A1* | 1/2013 | Miao et al. | 345/633 |
| 2013/0050432 A1* | 2/2013 | Perez et al. | 348/47 |
| 2013/0070068 A1* | 3/2013 | Garvey et al. | 348/61 |
| 2013/0127980 A1* | 5/2013 | Haddick et al. | 348/14.08 |
| 2013/0222308 A1* | 8/2013 | Ma | G09G 5/10 345/173 |
| 2013/0234826 A1* | 9/2013 | Sekiguchi et al. | 340/5.53 |
| 2013/0249786 A1* | 9/2013 | Wang | G06F 3/011 345/156 |
| 2013/0279017 A1* | 10/2013 | Amitai | 359/633 |
| 2013/0329183 A1* | 12/2013 | Blum et al. | 351/158 |
| 2013/0342569 A1* | 12/2013 | Karkkainen et al. | 345/633 |
| 2014/0063055 A1* | 3/2014 | Osterhout et al. | 345/633 |
| 2014/0080428 A1* | 3/2014 | Rhoads | G06F 17/30241 455/88 |
| 2014/0092015 A1* | 4/2014 | Xing | 345/158 |
| 2014/0101608 A1* | 4/2014 | Ryskamp et al. | 715/810 |
| 2014/0140677 A1* | 5/2014 | Cho | 386/230 |
| 2014/0160250 A1* | 6/2014 | Pomerantz et al. | 348/47 |
| 2014/0191964 A1* | 7/2014 | McDonald et al. | 345/158 |
| 2014/0253701 A1* | 9/2014 | Wexler | A61F 9/08 348/62 |
| 2014/0267009 A1* | 9/2014 | DeLean | 345/156 |
| 2014/0269224 A1* | 9/2014 | Huh et al. | 368/73 |
| 2014/0310764 A1* | 10/2014 | Tippett et al. | 726/1 |
| 2014/0320399 A1* | 10/2014 | Kim | G02B 27/0172 345/156 |
| 2014/0334666 A1* | 11/2014 | Lankford et al. | 382/103 |
| 2014/0347265 A1* | 11/2014 | Aimone et al. | 345/156 |
| 2015/0049487 A1* | 2/2015 | Connor | 362/277 |
| 2015/0100323 A1* | 4/2015 | Kozuka et al. | 704/275 |
| 2015/0102984 A1* | 4/2015 | Wong et al. | 345/8 |
| 2015/0120151 A1* | 4/2015 | Akay et al. | 701/49 |
| 2015/0173846 A1* | 6/2015 | Schneider | A61B 1/00009 600/424 |
| 2015/0235452 A1* | 8/2015 | Schowengerdt | G06T 19/006 345/633 |
| 2016/0070345 A1* | 3/2016 | Huang | G06F 3/01 351/206 |
| 2016/0171780 A1* | 6/2016 | Vardi | G06T 19/006 345/419 |
| 2016/0189678 A1* | 6/2016 | Nagara | G09G 5/10 345/617 |

OTHER PUBLICATIONS

Wikipedia, the free encyclopedia, "Google Glass", Aug. 7, 2013, pp. 1-22. retrieved from http://en.wikipedia.org/wiki/Google_Glass.

"Looxcie HD", User Manual, Version 2.0, Looxcie Inc., 2013, pp. 1-7.

"Looxcie 3", User Manual, Looxcie Inc., 2013, pp. 1-4.

Vidcie, "Looxcie HD Outdoor", Streaming video cam with full 1080p recording and built-in Wi-Fi, Looxcie, Inc., Feb. 4, 2014, pp. 1-6. retrieved from http://www.looxcie.com/looxcie-hd-outdoor/specifications/.

Lilly, Paul, "Nike's stroboscopic eyewear improves visual memory, hand-eye coordination", Print Page—Nike's stroboscopic eyewear improves visual memory, hand-eye coordination, ExtremeTech, Jul. 27, 2012, pp. 1-4.

Ratcliff, et al., "Indicating the Operational Status of a Camera", U.S. Appl. No. 13/834,017, filed Mar. 15, 2013, 34 pages.

* cited by examiner

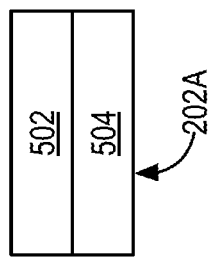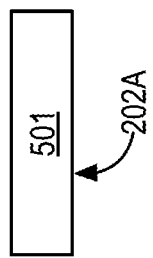
FIG. 5

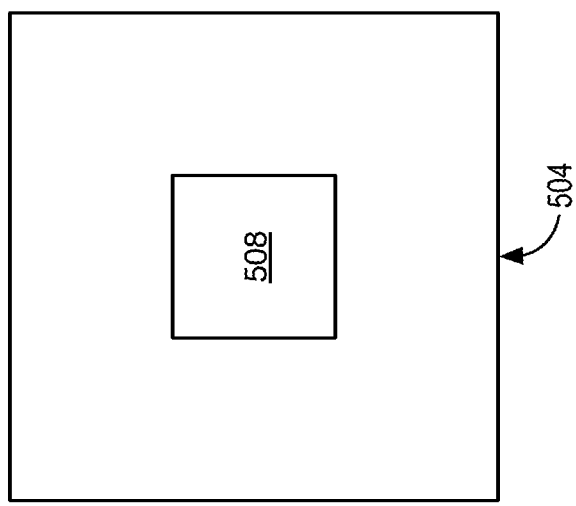
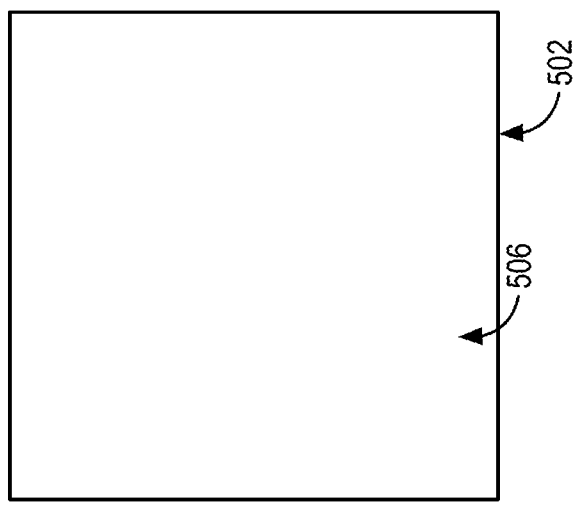
FIG. 6

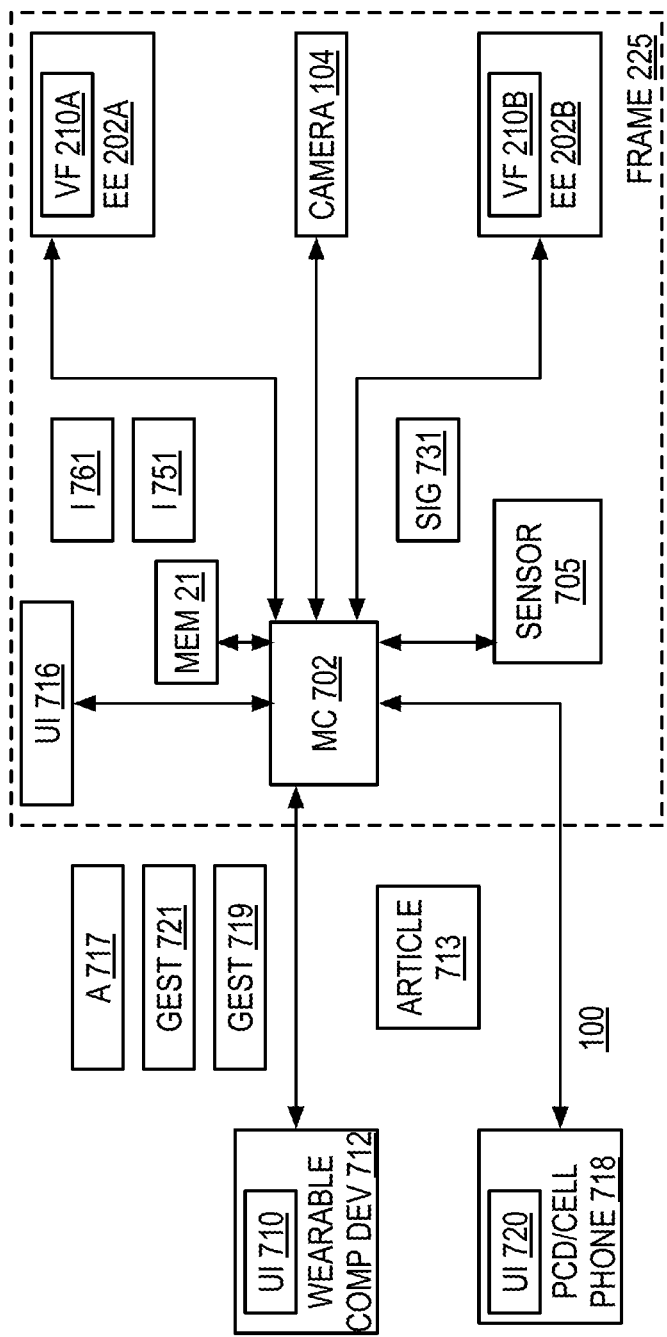

… (1)

VIEWFINDER WEARABLE, AT LEAST IN PART, BY HUMAN OPERATOR

TECHNICAL FIELD

Embodiments disclosed herein generally relate to at least one viewfinder that may be wearable, at least in part, by a human operator.

BACKGROUND

Cameras that can be worn on the human head are known. One such conventional system developed by Google Inc. of Mountain View, Calif., United States of America, under the tradename, Google Glass™, includes a multi-function wearable computer system. The system includes a camera, microphone, light emitting display element, microprocessor, touch pad, and speaker system mounted in and/or to (as the case may be) a frame that is worn over the user's ears. The microprocessor controls components of the system based upon user inputs. The system is capable of using the camera to take photographs of observables within the user's field of vision, which is not entirely co-extensive with the camera's field of view. The system's display provides visual feedback of which images are being captured by displaying the captured images in a peripheral corner region of the user's field of vision. Disadvantageously, this is an inherently unnatural position for viewfinding, and given that the user's field of vision is not entirely co-extensive with the camera's field of view, these factors can make the viewfinding and image capture unintuitive, inaccurate, difficult, and/or awkward. Additionally, in operation, the light emitting display element consumes an undesirably large amount of power to display the captured images. This reduces the battery life of the system. Further disadvantageously, the physical appearance of the system is generally unattractive and esthetically unpleasing to many users.

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which:

FIG. 5 illustrates features in an embodiment.
FIG. 6 illustrates features in an embodiment.
FIG. 7 illustrates features in an embodiment.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DESCRIPTION OF EMBODIMENTS

Figure 1:
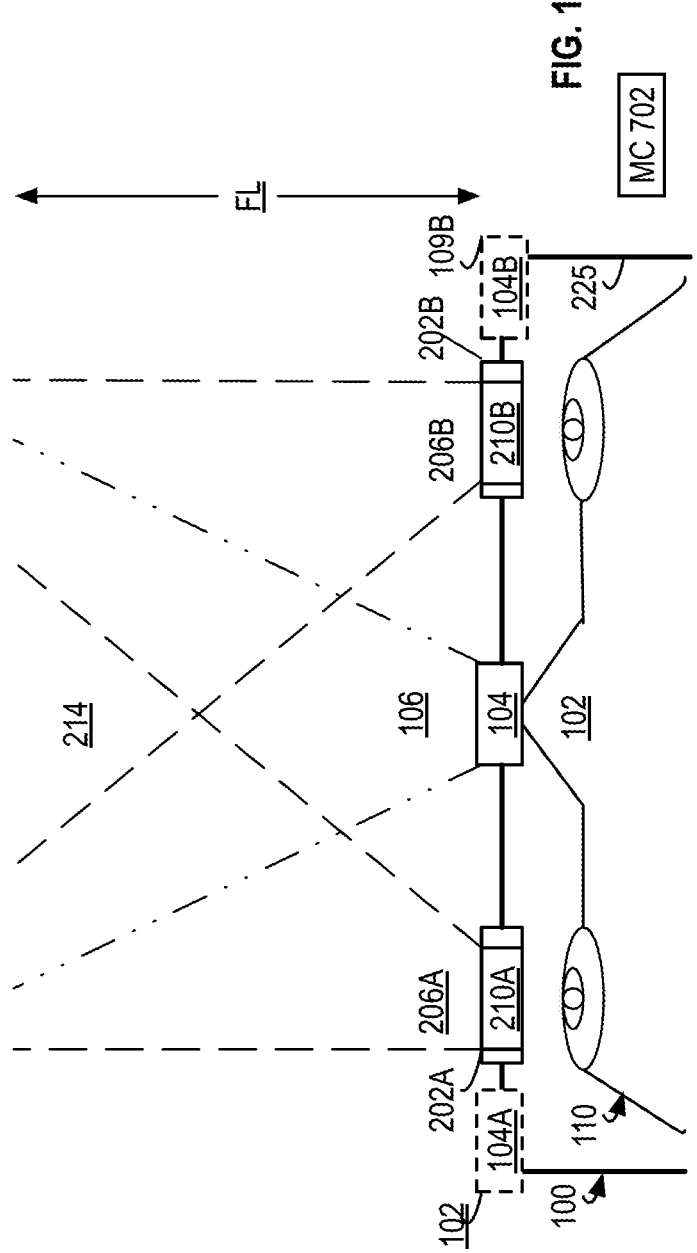
FIG. 1 illustrates features in an embodiment.

FIG. 1 illustrates an apparatus 100 according to an embodiment. Apparatus 100 may be dimensioned and/or adapted so as to be wearable, at least in part, by and/or on the face/head (collectively or singly referred to by numeral 110 in FIG. 1) of a human operator 102. In this embodiment, apparatus 100 may comprise, at least in part, one or more eyeglass frames 225. One or more frames 225 may be dimensioned and/or adapted so as to be wearable, at least in part, on the head/face 110. One or more frames 225 may comprise, at least in part, for example, epoxy, resin, plastic, composite, and/or other suitably durable, electrically insulating material, at least in and/or for those areas and/or portions of the one or more frames 225 that may be intended to contact (e.g., during operation of apparatus 100) the head/face 110 of the human operator 102.

Apparatus 100 also may comprise, at least in part, one or more cameras 104, 104A, and/or 104B. For example, in this embodiment, apparatus 100 may comprise, at least in part, (1) one or more cameras 104 that may be mounted to and/or in, at least in part, one or more central bridge regions 107 of one or more frames 225, (2) one or more cameras 104A that may be mounted to and/or in, at least in part, one or more rim/temple end piece regions (collectively or singly referred to by numeral 109A in FIG. 1) of one or more frames 225, and/or (3) one or more cameras 104B that may be mounted to and/or in, at least in part, one or more oppositely positioned (e.g., relative to one or more regions 109A) rim/temple end piece regions 109B of one or more frames 225. As a result, at least in part, of being mounted in and/or to one or more human operator-wearable frames 225, one or more cameras 104, 104A, and/or 104B may likewise be wearable, at least in part, by and/or on the head/face 110 the human operator 102.

Although the following discussion will proceed with reference to one or more cameras 104 being present in apparatus 100 of this embodiment, it should be understood that, alternatively or additionally, apparatus 100 of this embodiment may comprise, at least in part, one or more additional cameras 104A and/or 104B, and/or other (not shown) cameras. Without departing from this embodiment, the principles and/or techniques of this embodiment that will be described herein with reference to one or more cameras 104 may be applied to such other and/or additional cameras in similar and/or analogous fashion. Likewise, although the following discussion will proceed with reference to apparatus 100 being binocular, the principles and/or techniques of this embodiment may be applied to monocular schemes. In this embodiment, each of the cameras 104, 104A, 104B may be or comprise, at least in part, one or more respective multi-element, multi-mega pixel, color, optical cameras/image sensors, together with suitable image processing circuitry, firmware, and/or software. Many modifications, variations, and/or alternatives are possible without departing from this embodiment.

As will be discussed in greater detail below, in this embodiment, one or more cameras 104 and/or apparatus 100 may have multiple modes of operation that may include, for example, enabled mode, disabled mode, and/or image capture/visual shutter indication mode (see FIG. 2). For example, when enabled (e.g., placed in active and/or operational state/mode for and/or permitting image capture), one or more cameras 104 may have one or more active fields 106 of view. These one or more view fields 106 may be captured by the one or more cameras 104 in response, at least in part, to image capture actuation by the human operator 102.

Apparatus 100 also may comprise, at least in part, one or more (and in this embodiment, a plurality of) eyeglass elements 202A, 202B. Eyeglass elements 202A, 202B may be mounted and/or attached in and/or to one or more frames 225 so as to be worn, at least in part, on the head/face 110 of the operator 104 when the one or more frames 225 are being worn, at least in part, on the head/face 110 of the operator 104. Eyeglass elements 202A, 202B may be located, at least in part, in locations similar or analogous to where, in ordinary eyeglasses, the lenses of the ordinary eyeglasses may be located. In this embodiment, when the one or more cameras 104 are enabled, one or more eyeglass elements 202A, 202B may comprise one or more respective portions 204A, 204B (see FIG. 2) through which the human operator 102 may view (when the one or more frames 225 are properly worn by the operator 102), in relation to one or more respective viewfinders 210A, 210B, one or more regions 206A, 206B that may be visible, at least in part, to the operator 102.

For example, when the one or more cameras 104 are enabled, the apparatus 100 may comprise one or more viewfinders 210A in eyeglass element 202A, and one or more viewfinders 210B in eyeglass element 202B. As a result, at least in part, of eyeglass elements 202A, 202B being wearable, at least in part, on the head/face 110 of the operator 102, these viewfinders 210A, 210B likewise may be wearable, at least in part, on the operator's head/face 110. Each of the viewfinders 210A, 210B may provide to the operator 102, prior to image capture actuation of the one or more cameras 104, one or more respective visual indications 112A, 112B of the one active view fields 106 of the one or more cameras 104. In this embodiment, the visual indications 112A, 112B may be displayed in one or more respective central fields 114A, 114B of vision of the operator 102.

For example, each viewfinder 210A, 210B may indicate, at least in part, one or more active view fields 106 by providing to the operator 102, one or more respective visual boundaries 212A, 212B that may delimit (e.g., border and/or define) one or more capture regions 214 of the one or more cameras 104. One or more capture regions 214 may be within, at least in part, (1) one or more active view fields 106, and (2) both of two respective regions 206A, 206B that may be visible to the operator 102 through and/or via the respective viewfinders 210A, 210B.

For example, as will be discussed below, when the one or more frames 225 are properly worn by the operator 102 and the one or more cameras 104 are enabled, one or more (and in this embodiment, a plurality of) respective regions 206A, 206B may be visible to the operator 102 through the respective viewfinders 210A, 210B (i.e., as delimited and/or defined by one or more visual boundaries 212A, 212B). These regions 206A, 206B may overlap, at least in part, the one or more active view fields 106 of the one or more cameras 104, but also may not be co-extensive with the one or more active view fields 106. These one or more visual regions of overlap among the regions 206A, 206B and the one or more view fields 106 may be or comprise, at least in part, one or more capture regions 214. Thus, one or more capture regions 214 may be visible both the operator 102 (e.g., through the viewfinders 210A, 210B) and to the one or more cameras.

For example, as is described below, one or more (and in this embodiment, both) of the eyeglass elements 202A, 202B may be or comprise, at least in part, (1) one or more respective controllably, variable transparent electrochromic panels/panel elements, (2) one or more respective controllable liquid crystal display (LCD) panels/panel elements, and/or (3) one or more other and/or additional types of panels/panel elements whose transmissivity and/or opacity with respect to (e.g., incident) optical and/or other electromagnetic radiation may be controlled and/or modulated by application of appropriate control signals. For example, in this embodiment, apparatus 100 and/or frame 225 may comprise and/or be communicatively coupled to, at least in part, one or more microcontrollers 702. One or more microcontrollers 702 may be capable, at least in part, in generating and/or issuing one or more control signals whose generation and/or issuance (1) may control, at least in part, the operation/operational mode of the one or more cameras 104, and/or (2) may result, at least in part, in the optical transmissivity and/or opacity of one or more portions of either both of the eyeglass elements 202A, 202B being controllably modulated in accordance with and/or to satisfy the operational characteristics (described in greater detail below) of the apparatus 100 in the apparatus' disabled, enabled, and/or visual indication/shutter modes of operation. The apparatus 100 may permit the operator 102 to be able to control, at least in part, the generation and/or issuance of these (and/or other) control signals by the one or more microcontroller 702, based at least in part upon input from the operator 102.

Figure 2:
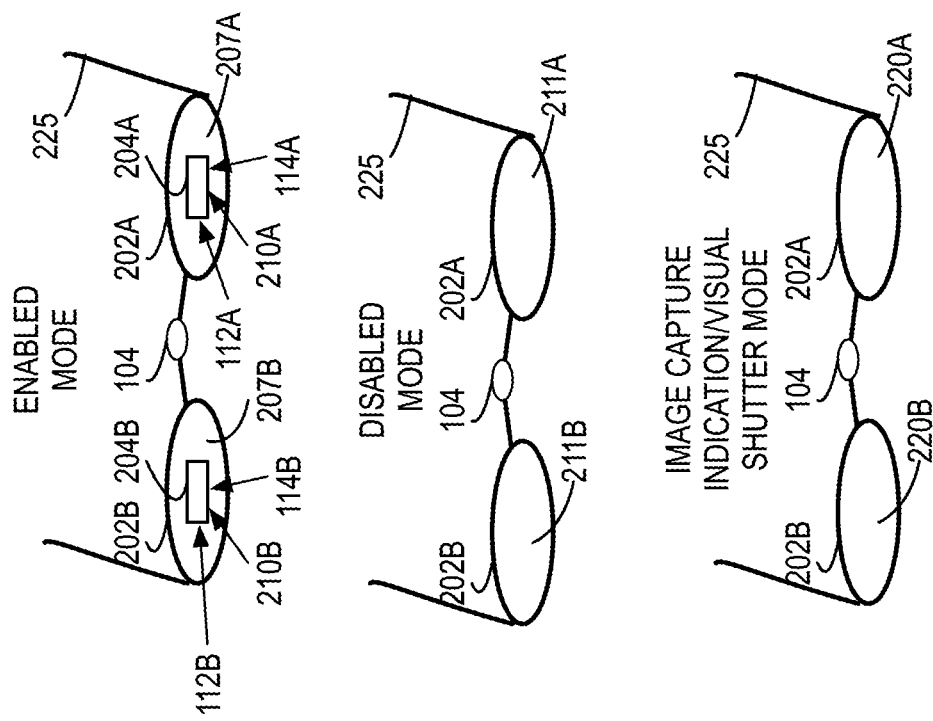
FIG. 2 illustrates features in an embodiment.

For example, as shown in FIG. 2, in the disabled mode of operation of the apparatus 100 and/or one or more cameras 104, the optical transmissivity and/or opacity of the eyeglass elements 202A, 202B may be controlled and/or modulated so as to provide wholly (or at least partially or essentially) transparent portions 211A, 211B of the eyeglass elements 202A, 202B that may not obstruct, block, distort, and/or occlude the vision of the operator 102 through those portions of the elements 202A, 202B that are not occluded by the one or more frames 225. Conversely, in the enabled mode of operation of the apparatus 100 and/or one or more cameras 104, the optical transmissivity and/or opacity of the eyeglass elements 202A, 202B may be controlled and/or modulated so as to provide (1) wholly (or at least partially or essentially) transparent portions 204A, 204B of the eyeglass elements 202A, 202B, and (2) at least partially visually darkened, opaque, non-transparent, and/or occluded portions 207A, 207B of the eyeglass elements 202A, 202B. In this embodiment, transparent portions 204A, 204B may be delimited by respective rectangular borders/boundaries 212A, 212B that may define the edges of the darkened portions 207A, 207B. Taken together and in juxtaposition to each other, one or more transparent portions 204A and one or more darkened portions 207A of one or more eyeglass elements 202A may provide and/or constitute, at least in part, to the operator 102 the one or more viewfinders 210A and/or one or more visual indications 112A displayed in one or more central vision fields 114A of the operator 102 through one or more eyeglass elements 202A. Analogously, in this embodiment, taken together and in juxtaposition to each other, one or more transparent portions 204B and one or more darkened portions 207B of one or more eyeglass elements 202B may provide and/or constitute, at least in part, to the operator 102 the one or more viewfinders 210B and/or one or more visual indications 112B displayed in one or more central vision fields 114B of the operator 102 through one or more eyeglass elements 202B. As is further discussed below, the respective locations, dimensions, and/or shapes of the one or more respective viewfinders 210A, 210B, portions 204A, 204B, and/or visual indications 112A, 112B may be predeterminedly and/or dynamically selected so as to achieve and/or correspond, at least in part, to (1) one or more fixed and/or dynamically selectable focal lengths (FL in FIG. 1) of the one or more cameras 104, (2) one or more visible regions 206A, 206B, and/or (3) one or more capture regions 214.

Also conversely, in the visual indication/shutter mode of operation of the apparatus 100 and/or one or more cameras 104, the optical transmissivity and/or opacity of the eyeglass elements 202A, 202B may be controlled and/or modulated so as to provide respective at least partially visually darkened, opaque, non-transparent, and/or occluded portions 220A, 220B of the eyeglass elements 202A, 202B. In this embodiment, the visual indication/shutter mode of operation may occur in response, at least in part, to image capture actuation. The visual indication/shutter mode may have a duration similar to that consumed to cycle a conventional camera shutter (e.g., a fraction of a second), and may be accompanied by the generation by apparatus 100 of a suitable "click" or other camera shutter-like sound of equal duration. In the visual indication/shutter mode, the relatively sudden darkening of the eyeglass elements 202A, 202B may provide, at least in part, to the operator 102, one or more respective visual indications that image capture by the one or more cameras 104 of the one or more capture regions 214 has occurred.

Figure 3:
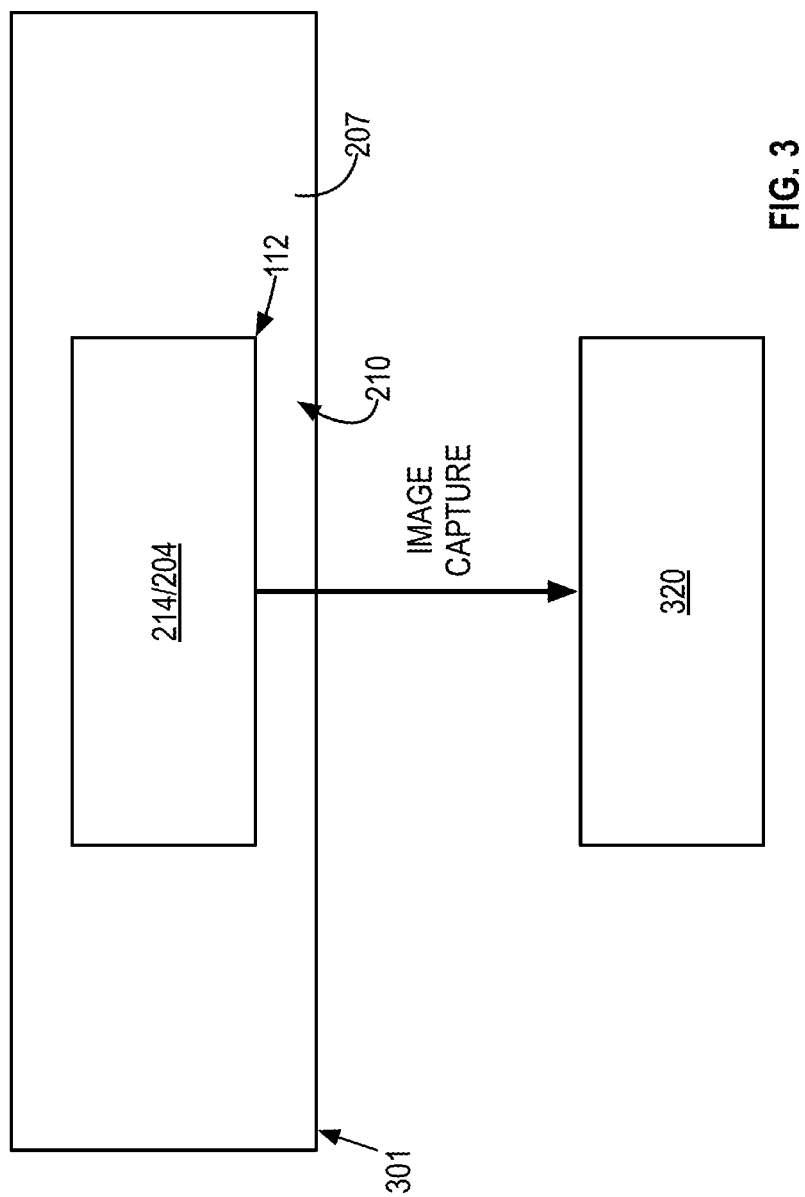
FIG. 3 illustrates features in an embodiment.

FIG. 3 illustrates what may be seen by the operator 102 during the enabled mode of operation of the apparatus 100 and/or one or more cameras 104, when the one or more frames 225 are properly worn by the operator 102. As will be appreciated, as perceived by the operator 102, the individual views seen by the respective eyes of the operator 102 are merged into a single perceived composite binocular image 301. In this image 301, the darkened portions 207A, 207B and the transparent portions 204A, 204B of the eyeglass elements 204A, 204B result in an at least partially darkened/occluded region 207 that surrounds rectangular non-darkened/non-occluded region 204, with that which is visible to the operator 102 in the non-occluded region 204 corresponding to one or more image capture regions 214. The one or more images 320 captured by the one or more cameras 104 in response to image capture actuation, correspond, at least in part, to that which is visible in one or more image capture regions 214. Thus, in this embodiment, in the image 301, all of the visible regions 206A, 206B may be darkened/occluded except for the one or more image capture regions 214. Thus, in image 301, taken together and in juxtaposition to each other, the darkened/occluded region 207 and non-darkened/non-occluded region 204 may provide and/or constitute, at least in part, to the operator 102 the one or more (composite, as seen by the operator 102) viewfinders 210 and/or one or more visual indications 112 displayed in one or more central vision fields of the operator 102.

Conversely, when operating in the image capture indication/visual shutter mode of operation, the entirety of the image 301 may be darkened/occluded, at least in part, as a result, at least in part, of darkened/occluded portions 220A, 220B being provided in eyeglass elements 202A, 202B. For example, in this mode of operation, this may result in the entirety of regions 207 and 204 being darkened/occluded.

Figure 4:
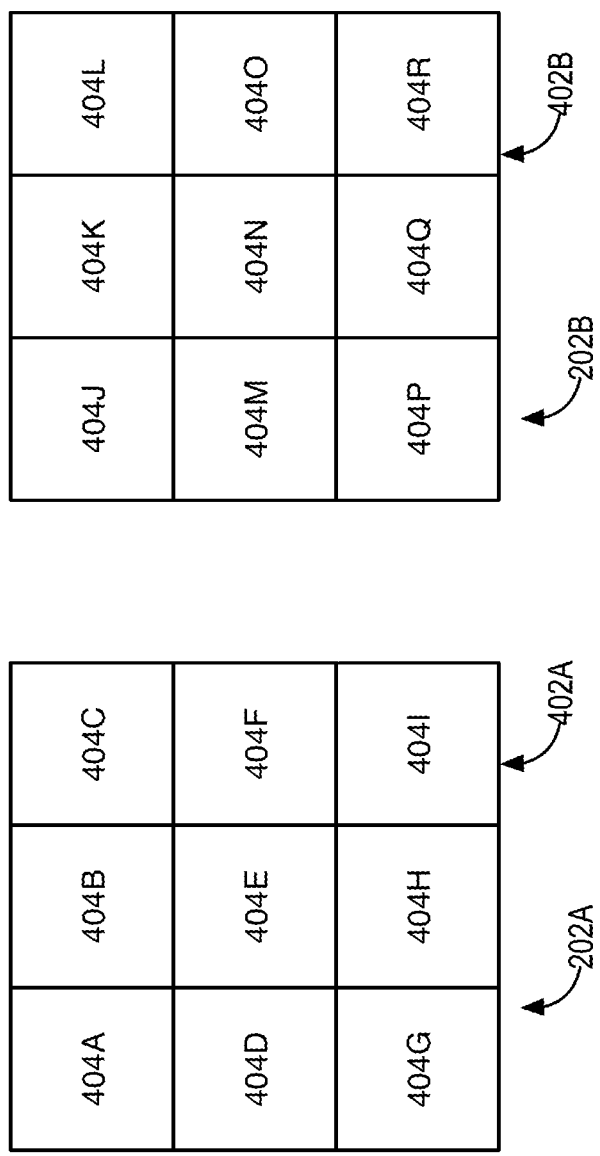
FIG. 4 illustrates features in an embodiment.

Turning now FIG. 4, schematic illustration of an exemplary manner of implementation of eyeglass elements 202A, 202B is presented. In the example of FIG. 4, the eyeglass elements comprise respective grids/matrices 402A, 402B of controllable elements. For example, one or more matrices 402A may comprise, at least in part, controllable elements 404A . . . 404I. Also, for example, one or more matrices 402B may comprise, at least in part, controllable elements 404J . . . 404R. Of course, the respective numbers, types, configurations, dimensions, and/or shapes of matrices 402A, 402B, and/or their respective sets of controllable elements 404A . . . 404I, 404J . . . 404R may vary, at least in part, from that which is described herein, without departing from this embodiment, depending upon, for example, the particular implementation and/or camera characteristics and/or focal properties.

Each of the matrices 402A, 402B, and/or their respective controllable elements 404A . . . 404I, 404J . . . 404R may be controllable, at least in part, by one or more microcontrollers 702, so as to be able to controllably modulate, at least in part, their respective optical transmissivities and/or opacities in such a way as to operate, at least in part, in the manner described previously. For example, each of the matrices 402A, 402B, and/or their respective controllable elements 404A . . . 404I, 404J . . . 404R, may be or comprise one or more respective electrochromic and/or LCD elements whose respective optical transmissivities and/or opacities may be controllably varied (e.g., changed) based upon and/or in response to, at least in part, one or more control signals generated, at least in part, by one or more microcontrollers 702 and/or supplied, at least in part, to the matrices 402A, 402B and/or their respective controllable elements 404A . . . 404I, 404J . . . 404R. For example, the respective transparencies of matrices 402A, 402B and/or their respective controllable elements 404A . . . 404I, 404J . . . 404R may be controlled, at least in part, by one or more microcontrollers 702 so as to provide, depending upon the particular mode of operation of the apparatus 100 and/or one or more camera 104, transparent portions 211A, 211B (in the disabled mode of operation), transparent portions 204A, 204B, darkened portions 207A, 207B, viewfinders 210A, 210B, and/or one or more visual indications 112A, 112B (in the enabled mode of operation), and/or darkened/occluded portions 220A, 220B (in the image capture indication/visual shutter mode of operation).

Thus, for example, in this embodiment, in the disabled mode of operation, all of the elements 404A . . . 404I, 404J . . . 404R may be controlled so as to be transparent. Conversely, in the enabled mode of operation, elements 404A . . . 404I, 404J . . . 404R may be controlled such that all of these elements, except for elements 404E and 404N, may be darkened/occluded, while elements 404E and 404N may be transparent. Further conversely, in the image capture indication/visual shutter mode of operation, elements 404A . . . 404I, 404J . . . 404R may be controlled such that all of these elements may be darkened/occluded.

In this embodiment, although not shown in the Figures, conductive control signal paths may be embedded in the one or more frames 225, matrices 402A, 402B, elements 202A, 202B, and/or elements 404A . . . 404I, 404J . . . 404R so as to permit propagation of appropriate control signals to elements 404A . . . 404I, 404J . . . 404R to permit the foregoing functionality to be achieved. These control signals may be propagated, for example, by, based upon, and/or in response to control signals generated, at least in part, by microcontroller 702. In an embodiment, the conductive paths embedded in the matrices 402A, 402B, elements 202A, 202B, and/or elements 404A . . . 404I, 404J . . . 404R may be transparent. Depending upon the particular implementation, the materials that may be suitable for this purpose may include, for example, indium-tin-oxide and/or other materials.

Without departing from this embodiment, eyeglass elements 202A, 202B may comprise one or more layers of electrochromic film and/or LCD material. For example, if LCD shuttering is employed, elements 202A, 202B may comprise multiple layers of such film/material.

For example, as shown in FIG. 5, one or more eyeglass elements (e.g., 202A) may comprise a single layer 501 of such film and/or LCD material. Alternatively, without departing from this embodiment, one or more eyeglass elements 202A may comprise multiple layers 502, 504 of such film and/or LCD material. Each of the eyeglass elements 202A, 202B may have a similar or identical construction and/or operation, at least in part. Alternatively, without departing from this embodiment, the respective construction and/or operation of eyeglass elements 202A, 202B may differ, at least in part.

Each of these multiple layers 502, 504 may be or comprise a respective controllably variably transparent electrochromic film/LCD material layer, whose transparency/opacity characteristics may be controlled, at least in part, by one or more microcontrollers 702. Layers 502, 504 may be positioned adjacent one another and/or may be in essentially intimate contact with each other. When the one or more frames 225 are properly worn by the operator 102, one or more layers 502 may be positioned distal to the (not shown) eyes of the operator 102, while one or more layers 504 may be positioned proximal to the eyes of the operator 102. One or more layers 502 may be dimensioned so as to match and/or correspond to (e.g., completely and/or entirely, or at least in part) the area/shape 506 of one or more eyeglass elements 202A. One or more layers 504 may comprise, at least in part, one or more regions 508 that may be dimensioned and/or located in the one or more layers 504 so as to correspond, at least in part, to the one or more active view fields 106 and/or one or more image capture regions 214. Thus, depending upon the particular mode of operation, by appropriately controlling the transparency/opacity of the layers 502, 504 (and/or their respective regions), the one or more viewfinders 210A, indications 112A, and/or darkened portions 220A may be provided.

Without departing from this embodiment, one or more cameras 104 may be controllable optically zoomable and/or may have one or more selectively variable focal lengths FL. In this arrangement, one or more of the electrochromic and/or LCD elements 404A . . . 404I, 404J . . . 404R in each of the eyeglass elements 202A, 202B may be dynamically controllable (e.g., by the one or more microcontrollers 702) so as to permit one or more visual indications 112A, 112B to correspond, at least in part, to one or more currently selected focal lengths FL of the one or more cameras 104. In this embodiment, in actual implementation, the actual number of such elements 404A . . . 404I, 404J . . . 404R may be significantly larger than that depicted and/or previously described herein so as to permit the granularity of selectable focal lengths to be meaningfully large given and/or calibrated with the intended usage model of the apparatus 100. For example, as the one or more cameras 104 zoom out into the distance, the focal length increases, and accordingly, the area and delimiting dimensions of one or more regions 214 and/or portions 204 (see FIG. 3) should correspondingly decrease. The number, dimensions, and/or configurations of independently controllable elements 404A . . . 404I, 404J . . . 404R may be selected, calibrated, and/or determined, at least in part, based upon empirically-determined relationships, so as to correspond, at least in part, to the desired level of focal length control granularity of one or more cameras 104. These relationships may be programmed into one or more microcontrollers 702 so as to permit the one or more microcontrollers 702 to be able to appropriately control the transparencies/opacities of the independently controllable elements 404A . . . 404I, 404J . . . 404R, as a function of operator-selected focal length of the one or more cameras 104, so as to implement the foregoing features of this embodiment.

In this embodiment, apparatus 100, one or more cameras 104, one or more viewfinders 210A, 210B, one or more of the controllable elements 404A . . . 404I, 404J . . . 404R, and/or one or more other components of apparatus 100 may be controlled, at least in part, by one or more microcontrollers 702 such that apparatus 100, one or more cameras 104, one or more viewfinders 210A, 210B, one or more of the controllable elements 404A . . . 404I, 404J . . . 404R may perform, at least in part, the operations described herein as being performed by apparatus 100, one or more cameras 104, one or more viewfinders 210A, 210B, and/or one or more of the controllable elements 404A . . . 404I, 404J . . . 404R. These and/or other operations of apparatus 100, one or more cameras 104, one or more viewfinders 210A, 210B, one or more of the controllable elements 404A . . . 404I, 404J . . . 404R, one or more microcontrollers 702, and/or one or more other components of apparatus 100 may be controlled, at least in part, based upon and/or in response to, at least in part, one or more of the following: (1) one or more (e.g., predetermined and/or user programmed) physical gestures (symbolically illustrated by block 719 in FIG. 7) of operator 102, (2) one or more (e.g., predetermined and/or user programmed) facial gestures (symbolically illustrated by block 721 in FIG. 7) of operator 102, (3) one or more physical actions (symbolically illustrated by block 717 in FIG. 7) related to, for example, (a) one or more articles (e.g., of clothing, jewelry, etc.) 713 worn by the operator 102, (b) one or more wearable computing devices (e.g., 712), and/or (c) one or more portable computing devices/cellular telephones 718 capable of being carried/worn, at least in part, by the operator 102, (4) one or more neurological and/or biofeedback signals 731 initiated by and/or related, at least in part, to operator 102, (5) detection of the presence of one or more previously uncaptured images 751, (6) one or more spoken words and/or spoken sounds, and/or (7) one or more sounds.

For example, one or more sensors 705 may be comprised, at least in part, in the one or more frames 225 (and/or elsewhere, e.g., on and/or near the body and/or clothing of the operator 102). One or more sensors 705 may detect, at least in part, occurrence of one or more predetermined and/or user programmed actions, gestures, object manipulations, facial expressions, etc. that may correspond, at least in part, to operations to be performed by the apparatus 100, one or more cameras 104, one or more viewfinders 210A, 210B, one or more of the controllable elements 404A . . . 404I, 404J . . . 404R, one or more microcontrollers 702, and/or one or more other components of apparatus 100.

Additionally or alternatively, one or more sensors 705 may be or comprise, at least in part, one or more biofeedback and/or neurological activity monitors and/or sensors. In this arrangement, one or more sensors 705 may detect, at least in part, occurrence of one or more predetermined and/or user programmed signals 731 that may correspond to and/or result from, at least in part, one or more predetermined and/or user programmed muscle movements, galvanic responses, brain-waves, and/or biological/neurological phenomena initiated by and/or related to, at least in part, operator 102.

Non-limiting examples of physical actions and/or object manipulations 717 that may be contemplated by this embodiment include, but are not limited to touching, squeezing, moving, rotating, shaking, tapping, etc. by the operator 102 of one or more articles 713. For example in this embodiment, one or more articles 713 may be or comprise, at least in part, one or more bracelets to be worn, at least in part, on the (not shown) arm (or other body part) of the operator 102. Non-limiting examples of physical and/or facial gestures 719, 721 that may be contemplated by this embodiment include, but are not limited to one or more eye winks, smiles, eye blinks, hand waves/swipes/other gestures, finger movements, etc.

Additionally or alternatively, in this embodiment, one or more devices 712, 718 and/or apparatus 100 may each comprise, at least in part, one or more respective user interfaces 710, 720, 716. Each of these user interfaces may be capable, at least in part, of receiving and/or processing user input provided by the operator 102 that may command and/or correspond, at least in part, to operations to be performed by the apparatus 100, one or more cameras 104, one or more viewfinders 210A, 210B, one or more of the controllable elements 404A . . . 404I, 404J . . . 404R, one or more microcontrollers 702, and/or one or more other components of apparatus 100. One or more microcontrollers 702 may issue, at least in part, appropriate commands to apparatus 100 and/or one or more components thereof that may result, at least in part, in the performance of the operations commanded by the operator 102. Non-limiting examples of user input that may be received and/or processed, at least in part, by one or more of the interfaces 716, 712, and/or 720 in this embodiment may include, but may be limited to one or more hand/finger waves/swipes/taps/other gestures, click commands, typed commands, etc.

Additionally or alternatively, in this embodiment, one or more frames 225 may comprise, at least in part, one or more memories 21 that may store, at least temporarily, and/or at least in part, one or more images 761 previously captured by one or more cameras 104. One or more microcontrollers 702 may compare, at least in part, on an on-going basis, these one or more images 761 with one or more current video data streams from one or more cameras 702 and/or sensors 705 to detect, at least in part, whether the one or more cameras 702 and/or sensors 705 currently may be sensing one or more images 751 (e.g., of one or more predetermined/user-programmable types) that may be new (e.g., previously uncaptured). Such comparisons may be carried out, at least in part, using, for example, mathematical decompositions/hashes of the images 751, 761 and/or data streams. If one or more such new images 751 are detected, they may be captured, at least in part, by one or more cameras 104, and stored, at least in part, in memory 21. One or more images 751 and/or 761 stored in memory 21 may be retrieved and/or transmitted, at least in part, in response at least in part to one or more commands from operator 102 and/or microcontroller 702, to one or more devices 712, 720. Examples of the types of images that may be subject to such examination may include, for example, one or more human facial images.

Additionally or alternatively, one or more sensors 705 may be or comprise, at least in part, one or more sound sensors. In this arrangement, one or more sensors 705 may detect, at least in part, occurrence of one or more predetermined and/or user programmed ambient sounds, words, and/or implicit/explicit voice commands that may correspond to one or more operations to be performed by the apparatus 100, one or more cameras 104, one or more viewfinders 210A, 210B, one or more of the controllable elements 404A . . . 404I, 404J . . . 404R, one or more microcontrollers 702, and/or one or more other components of apparatus 100. Based upon, and/or in response, to at least in part, detection of such ambient sounds, microcontroller 702 may issue, at least in part, one or more control signals that may result, at least in part, performance of one or more corresponding operations by the apparatus 100, one or more cameras 104, one or more viewfinders 210A, 210B, one or more of the controllable elements 404A . . . 404I, 404J . . . 404R, one or more microcontrollers 702, and/or one or more other components of apparatus 100.

Depending upon the particular implementation in this embodiment, and assuming that the one or more frames 225, one or more cameras 104, and/or each of one or more elements 202A, 202B are positioned sufficiently close to the eyes of the operator 102, the respective viewfinders 210A, 210B may each have a respective width (W), and the active view field (ACV) 106 of the one or more cameras 104 may satisfy the following relationship:

$$W = 2 * Z * \tan(ACV/2), \text{ where}$$

Z is the distance from the eyes of the operator 102 to the phenomenon whose image is to be captured. Depending upon the particular implementation, the distance Z may be fixed so as to permit sufficient usability without unduly sacrificing versatility. However, alternatively, as discussed above, if the one or more cameras 104 have controllably variable focal length, then this value Z may be controllably variable (e.g., up to an empirically determinable maximum value below which sufficient performance may be provided). In such a variable focal length arrangement, sufficient spatial resolution/granularity of the independently controllable elements of the eyeglass elements 202A, 202B may be provided to permit meaningful user appreciation/use of such variable focal length in accordance with the principles of this embodiment.

In this embodiment, one or more devices 712, 720, one or more interfaces 716, one or more sensors 705, one or more cameras 104, memory 21, and/or one or more elements 202A, 202B may be communicatively coupled, at least in part, to one or more microcontrollers 702. In this embodiment, a first entity may be "communicatively coupled" to a second entity if the first entity is capable of transmitting to and/or receiving from the second entity one or more commands and/or data. For example, in this embodiment, such transmitting and/or receiving may be carried out via, at least in part, one or more wireless and/or wired networks. In this embodiment, a "wireless network" may be or comprise an instrumentality that permits, at least in part, at least two entities to be wirelessly communicatively coupled, at least in part. In this embodiment, a "wired network" may be or comprise an instrumentality that permits, at least in part, at least two entities to be communicatively coupled, at least in part, via non-wireless means, at least in part. In this embodiment, data may be or comprise one or more commands (for example one or more program instructions), and/or one or more such commands may be or comprise data. Also in this embodiment, an instruction may include data and/or one or more commands. Similarly, in this embodiment, data may include one or more instructions and/or one or more commands.

Also, in this embodiment, a "computer," "host," "server," "client," "node", and/or "device" may be used interchangeably, and may be or comprise, for example, one or more end stations, smart phones, tablet computers, appliances, communication instrumentalities, intermediate stations, network interfaces, clients, servers, storage, mass storage, and/or components and/or portions thereof. In this embodiment, a "network," "channel", "communication link," and/or "communication lane" may be used interchangeably, and may be or may comprise, for example, one or more virtual, physical, and/or logical mechanisms, instrumentalities, modalities, and/or portions thereof that may permit, facilitate, and/or allow, at least in part, two or more entities to be communicatively coupled together.

In this embodiment, an eyeglass frame or frame may be or comprise, at least in part, a physical structure that is capable, at least in part, of being worn, at least in part, on and/or by a human's head and/or face. In this embodiment, a camera may be or comprise, at least in part, an entity that is capable, at least in part, of capturing an image. In this embodiment, an image may be or comprise, at least in part, a physical phenomenon that may be amenable to observation and/or characterization, at least in part, via, based upon, and/or using, at least in part, electromagnetic radiation (e.g., incident electromagnetic radiation reflected and/or emitted from the phenomenon). In this embodiment, an image may be said to be captured if a representation, at least in part, of the image is (1) stored, at least temporarily and/or at least in part, and/or (2) reproduced, at least in part. In this embodiment, reproduction and/or representation of an image may (but is not required to) involve, at least in part, digital, analog, and/or visual reproduction and/or representation of the image. Also, in this embodiment, image capture actuation may comprise (1) initiation, at least in part, of capture of an image, and/or (2) issuance, at least in part, of a request, command, and/or signal that results, at least in part, in capturing, at least in part, of an image and/or in initiating, at least in part, of capturing, at least in part, of an image. As will be appreciated by those skilled in the art, the dimensions, shape, and/or configuration of the one or more frames 225, eyeglass elements 202A, 202B, cameras 104, etc. may vary without departing from this embodiment.

In this embodiment, machine-readable program instructions may be stored in one or more computer-readable/writable memories 21, devices 712, 718, and/or microcontrollers 702. In operation of apparatus 100, these instructions may be respectively accessed and executed by devices 712, 718, and/or microcontrollers 702. When these instructions are so accessed and executed, this may result, at least in part, in these respective components performing the respective operations described herein as being performed by these respective components.

In this embodiment, memory 21 may comprise one or more of the following types of memories: semiconductor firmware memory, programmable memory, non-volatile memory, mass storage, read only memory, electrically programmable memory, random access memory, flash memory, solid state drive memory, hard/fixed disk drive memory, magnetic disk memory, optical disk memory, phase-change memory, and/or other computer-readable and/or writable memory. Also, in this embodiment, a processor, processor core, core, and controller each may comprise respective circuitry capable of performing, at least in part, one or more arithmetic and/or logical operations, such as, for example, one or more respective central processing units. In this embodiment, an embedded controller may be or comprise a controller that is integrated, at least in part, in other circuitry, such as, for example, as one or more circuitry blocks in one or more integrated circuits (e.g., one or more integrated circuit chips or dice) that may comprise and/or embody other and/or additional circuitry and/or functionality. Additionally, in this embodiment, a user interface may be or comprise, at least in part, one or more virtual or physical keyboards/keypads, pointing devices, and/or display systems that may permit one or more human users 42 to interact with, to input commands and/or data to, to receive information/requests from, and/or to monitor, at least in part, one or more operations of one or more apparatus 100, one or more other devices, and/or one or more components thereof.

Also in this embodiment, "circuitry" may comprise, for example, singly or in any combination, analog circuitry, digital circuitry, hardwired circuitry, programmable circuitry, co-processor circuitry, state machine circuitry, and/or memory that may comprise program instructions that may be executed by programmable circuitry. In this embodiment, one or more microcontrollers 702 may be or comprise one or more embedded controllers. In this embodiment, an embedded controller may be or comprise a controller that is integrated, at least in part, in other circuitry, such as, for example, as one or more circuitry blocks in one or more integrated circuits (e.g., one or more integrated circuit chips or dice) that may comprise and/or embody other and/or additional circuitry and/or functionality.

Thus, in a first example in this embodiment, an apparatus is provided that may be wearable, at least in part, by a human operator. The apparatus may comprise a viewfinder wearable, at least in part, on the head of the human operator. The viewfinder may provide to the human operator, prior to image capture actuation, at least one visual indication of at least one active field of view of at least one camera. The at least one visual indication may be displayed in at least one central field of vision of the human operator.

In a second example of this embodiment that may comprise some or all of the elements of the first example, the apparatus may comprise at least one eyeglass element to be worn on the head of the human operator. The at least one camera also may be worn on the head of the human operator. In this second example, when the at least one camera is enabled, the at least one eyeglass element may comprise at least one portion through which the human operator is to view, in relation to the viewfinder, at least one region visible at least in part to the human operator.

In a third example of this embodiment that may comprise some or all of the elements of the first or second examples, the viewfinder may indicate, at least in part, the at least one active field of view by providing to the human operator, at least one visual boundary delimiting at least one capture region of the at least one camera within, at least in part, the at least one region visible, at least in part, to the human operator. In this third example, in response, at least in part, to the image capture actuation, at least one eyeglass element is to provide, at least in part, the human operator at least one other visual indication. The at least one other visual indication may be to indicate, at least in part, that image capture by the at least one camera of the at least one capture region has occurred.

In a fourth example of this embodiment that may comprise some or all of the elements of any of the preceding examples, at least one eyeglass element comprises at least one of the following: (1) at least one controllably, variably transparent electrochromic panel element, and/or (2) at least one controllable LCD panel element. In this fourth example, the at least one eyeglass element may be attached, at least in part, to an eyeglass frame wearable, at least in part, by the human operator. Also in this fourth example, the frame may comprise a microcontroller to control, at least in part, the at least one camera and the at least one eyeglass element, based at least in part upon input from the human operator.

In a fifth example that may comprise some or all of the elements of any of the preceding examples, the at least one camera may be controllably optically zoomable and may have a selectively variable focal length. In this fifth example, at least one eyeglass element may comprise at least one of the following: (1) controllable electrochromic elements, and/or (2) controllable LCD elements. Also in this fifth example, at least one of the electrochromic elements and/or LCD elements is to be dynamically controlled so as to permit the at least one visual indication to correspond to a currently selected focal length of the at least one camera.

In a sixth example that may comprise some or all of the elements of any of the preceding examples, at least one eyeglass element may satisfy at least one of the following: (1) at least one eyeglass element may comprise at least one matrix of controllably variable transparent elements whose respective transparencies may be controlled so as to provide regions that are to provide, at least in part, both the at least one visual indication and at least one other visual indication to indicate, at least in part, that image capture by the at least one camera has occurred, (2) the at least one matrix is comprised, at least in part, in the at least one eyeglass element, and/or (3) the at least one eyeglass element may comprise two controllably variably transparent film layers that may be adjacent to each other. One of these two layers may be dimensioned so as to correspond to an entirety of an area of the at least one eyeglass element. The other of these two layers may have at least one central region that may be dimensioned and located in the other of the two layers so as to correspond to the at least one active field of view.

In a seventh example of this embodiment that may comprise some or all of the elements of any of the preceding examples, the at least one camera and the viewfinder may be controlled, at least in part, based, at least in part, upon at least one of the following: (1) one or more physical gestures of the human operator, (2) one or more facial gestures of the human operator, (3) one or more physical actions related to: (a) at least one article worn by the human operator, (b) at least one wearable computing device worn by the human operator, and/or (c) at least one portable computing device capable of being carried by the human operator, (4) one or more biofeedback signals initiated, at least in part, by the human operator, (5) detection of presence of one or more previously uncaptured images, (6) one or more spoken words, (7) one or more spoken sounds, and/or (8) one or more sounds.

In an eighth example of this embodiment, computer-readable memory is provided that stores one or more instructions that when executed by a machine results in the performance of operations that may comprise any combination of any of the operations performed by the apparatus (and/or by any one or any combination of any of the components thereof) in any of the preceding examples. In a ninth example of this embodiment, a method is provided that may comprise (1) any combination of any of the operations performed by the apparatus (and/or by any one or any combination of any of the components thereof) in any of the preceding examples, and/or (2) any combination of any of the operations that may be performed by execution of the one or more instructions stored in the computer-readable memory of the eighth example of this embodiment.

In a tenth example of this embodiment, means may be provided to carry out any of, and/or any combination of, the operations that may be performed by the method, apparatus, computer-readable memory, in any of the preceding examples.

Advantageously, this embodiment may provide to the human operator inherently natural, accurate, easy, and/or intuitive viewfinding and/or image capture. Also advantageously, this embodiment may exhibit significantly reduced power consumption and improved battery life. Further advantageously, the physical appearance of this embodiment may be more attractive and esthetically pleasing.

Many alternatives, modifications, and/or variations are possible without departing from this embodiment. For example, in an eleventh example of this embodiment, machine-readable memory may be provided that may store instructions and/or design data, such as Hardware Description Language, that may define one or more subsets of the structures, circuitry, apparatuses, features, etc. described herein (e.g., in any of the preceding examples of this embodiment). Also, for example, additionally or alternatively, in a twelfth example of this embodiment, logic that may comprise, at least in part, physical hardware/circuitry may be provided that may be capable of performing, at least in part, the operations described herein as being performed by one or more microcontrollers 702, cameras 104, elements 202A, 202B, sensors 705, and/or interfaces 716.

Additionally or alternatively, in a thirteenth example of this embodiment, a system embodiment may be provided that may comprise, for example, at least one camera wearable, at least in part, by the human operator. The at least one camera may have, when enabled, the at least one active field of view that may be captured by the at least one camera in response, at least in part, to the image capture actuation by the human operator. Fourteenth, fifteenth, sixteenth, seventeen, eighteenth, and nineteenth examples of this embodiments may be provided that may be in accordance, at least in part, with the thirteenth example of this embodiment, but additionally or alternatively may also include some or all of the features of the second, third, fourth, fifth, sixth, and seventh examples, respectively, of this embodiment. Many other and/or additionally modifications, variations, and/or alternatives are possible. Accordingly, the claims are intended to embrace all such alternatives, modifications, and/or variations.

What is claimed is:

1. An apparatus wearable, at least in part, by a human operator, the apparatus comprising:
  a viewfinder wearable, at least in part, on a head of the human operator, the viewfinder to provide to the human operator, prior to image capture actuation, at least one visual indication of at least one active field of view of at least one camera, the at least one visual indication to be displayed in at least one central field of vision of the human operator;
  wherein the at least one camera and the viewfinder are capable of being controlled, at least in part, based, at least in part, upon (1) detection, based at least in part upon comparisons, at least in part, of at least one previously captured stored image with at least one current video data stream, of presence of one or more user-programmable types of currently sensed but previously uncaptured images, and (2) one or more of the following:
    (a) one or more user-programmed physical gestures of the human operator;
    (b) one or more user-programmed facial gestures of the human operator;
    (c) one or more user-programmed biofeedback signals initiated, at least in part, by the human operator;
  also wherein:
    the comparisons are to be carried out, at least in part, both on an on-going basis and using mathematical decomposition/hashing;
    the apparatus comprises at least one eyeglass element to be worn on the head of the human operator;
    the at least one camera also is to be worn on the head of the human operator;
    when the at least one camera is enabled, the at least one eyeglass element comprises at least one portion through which the human operator is to view, in relation to the viewfinder, at least one region visible at least in part to the human operator;
    the at least one eyeglass element comprises two controllably variably transparent film layers that are adjacent each other, one of the two layers being dimensioned so as to correspond to an entirety of an area of the at least one eyeglass element, the other of the two layers having at least one certain region that is dimensioned and located in the other of the two layers so as to correspond to the at least one active field of view;

optical transmissivity and/or opacity of the at least one eyeglass element being controllable, at least in part, so as to be capable of providing, in response at least in part to the image capture actuation, at least one visually non-transparent portion of the at least one eyeglass element to indicate, at least in part, that image capture has occurred.

2. The apparatus of claim 1, wherein:

the viewfinder is to indicate, at least in part, the at least one active field of view by providing to the human operator, at least one visual boundary delimiting at least one capture region of the at least one camera within, at least in part, the at least one region visible, at least in part, to the human operator; and in response, at least in part, to the image capture actuation, the at least one eyeglass element is to provide, at least in part, the human operator at least one other visual indication, the at least one other visual indication being to indicate, at least in part, that image capture by the at least one camera of the at least one capture region has occurred.

3. The apparatus of claim 1, wherein:

the at least one eyeglass element comprises at least one of:
  at least one controllably, variably transparent electrochromic panel element; and
  at least one controllable liquid crystal display (LCD) panel element;

the at least one eyeglass element is attached, at least in part, to an eyeglass frame wearable, at least in part, by the human operator;

the frame comprises a microcontroller to control, at least in part, the at least one camera and the at least one eyeglass element, based at least in part upon input from the human operator.

4. The apparatus of claim 1, wherein:

the at least one camera is controllably optically zoomable and has a selectably variable focal length;

the at least one eyeglass element comprises at least one of:
  controllable electrochromic elements; and
  controllable liquid crystal display (LCD) elements;

at least one of the eletrochromic elements and the LCD elements is to be dynamically controlled so as to permit the at least one visual indication to correspond to a currently selected focal length of the at least one camera.

5. The apparatus of claim 1, wherein:

the at least one eyeglass element satisfies at least one of the following subparagraphs (a) and (b):
  (a) the at least one eyeglass element comprises at least one matrix of controllably variably transparent elements whose respective transparencies are to be controlled so as to provide regions that are to provide, at least in part, both the at least one visual indication and at least one other visual indication to indicate, at least in part, that image capture by the at least one camera has occurred; and
  (b) the at least one matrix is comprised, at least in part, in at least one layer of the at least one eyeglass element.

6. A method that uses, at least in part, one or more apparatus wearable, at least in part, by a human operator, the method comprising:

providing, at least in part, to the human operator by a viewfinder wearable, at least in part, on a head of the human operator, prior to image capture actuation, at least one visual indication of at least one active field of view of at least one camera, the at least one visual indication to be displayed in at least one central field of vision of the human operator;

wherein the at least one camera and the viewfinder are capable of being controlled, at least in part, based, at least in part, upon (1) detection, based at least in part upon comparisons, at least in part, of at least one previously captured stored image with at least one current video data stream, of presence of one or more user-programmable types of currently sensed but previously uncaptured images, and (2) one or more of the following:
  (a) one or more user-programmed physical gestures of the human operator;
  (b) one or more user-programmed facial gestures of the human operator;
  (c) one or more user-programmed biofeedback signals initiated, at least in part, by the human operator;

also wherein:
  the comparisons are to be carried out, at least in part, both on an on-going basis and using mathematical decomposition/hashing; the one or more apparatus comprise at least one eyeglass element to be worn on the head of the human operator:
  the at least one camera also is to be worn on the head of the human operator:
  when the at least one camera is enabled, the at least one eyeglass element comprises at least one portion through which the human operator is to view, in relation to the viewfinder, at least one region visible at least in part to the human operator:

the at least one eyeglass element comprises two controllably variably transparent film layers that are adjacent each other, one of the two layers being dimensioned so as to correspond to an entirety of an area of the at least one eyeglass element, the other of the two layers having at least one certain region that is dimensioned and located in the other of the two layers so as to correspond to the at least one active field of view:

optical transmissivity and/or opacity of the at least one eyeglass element being controllable, at least in part, so as to be capable of providing. in response at least in part to the image capture actuation, at least one visually non-transparent portion of the at least one eyeglass element to indicate, at least in part. that image capture has occurred.

7. The method of claim 6, wherein:

the viewfinder is to indicate, at least in part, the at least one active field of view by providing to the human operator, at least one visual boundary delimiting at least one capture region of the at least one camera within, at least in part, the at least one region visible, at least in part, to the human operator; and in response, at least in part, to the image capture actuation, the at least one eyeglass element is to provide, at least in part, the human operator at least one other visual indication, the at least one other visual indication being to indicate, at least in part, that image capture by the at least one camera of at least one capture region has occurred.

8. The method of claim 6, wherein:

the at least one eyeglass element comprises at least one of:
- at least one controllably, variably transparent electrochromic panel element; and
- at least one controllable liquid crystal display (LCD) panel element;

the at least one eyeglass element is attached, at least in part, to an eyeglass frame wearable, at least in part, by the human operator;

the frame comprises a microcontroller to control, at least in part, the at least one camera and the at least one eyeglass element, based at least in part upon input from the human operator.

9. The method of claim 6, wherein:

the at least one camera is controllably optically zoomable and has a selectably variable focal length;

the at least one eyeglass element comprises at least one of:
- controllable electrochromic elements; and
- controllable liquid crystal display (LCD) elements;

at least one of the eletrochromic elements and the LCD elements is to be dynamically controlled so as to permit the at least one visual indication to correspond to a currently selected focal length of the at least one camera.

10. The method of claim 6, wherein:

the at least one eyeglass element satisfies at least one of the following subparagraphs (a) and (b):
- (a) the at least one eyeglass element comprises at least one matrix of controllably variably transparent elements whose respective transparencies are to be controlled so as to provide regions that are to provide, at least in part, both the at least one visual indication and at least one other visual indication to indicate, at least in part, that image capture by the at least one camera has occurred;
- (b) the at least one matrix is comprised, at least in part, in at least one layer of at least one eyeglass element.

11. Non-transitory computer-readable memory storing at least one instruction that when executed by a machine results in performance of operations comprising:

providing, at least in part, to the human operator by a viewfinder wearable, at least in part, on a head of the human operator, prior to image capture actuation, at least one visual indication of at least one active field of view of at least one camera, the at least one visual indication to be displayed in at least one central field of vision of the human operator;

wherein the at least one camera and the viewfinder are capable of being controlled, at least in part, based, at least in part, upon (1) detection, based at least in part upon comparisons, at least in part, of at least one previously captured stored image with at least one current video data stream, of presence of one or more user-programmable types of currently sensed but previously uncaptured images, and (2) one or more of the following:
- (a) one or more user-programmed physical gestures of the human operator;
- (b) one or more user-programmed facial gestures of the human operator;
- (c) one or more user-programmed biofeedback signals initiated, at least in part, by the human operator;

also wherein:
the comparisons are to be carried out, at least in part, both on an on-going basis and using mathematical decomposition/hashing;

the viewfinder is comprised, at least in part, in at least one eyeglass element to be worn on the head of the human operator:

the at least one camera also is to be worn on the head of the human operator;

when the at least one camera is enabled, the at least one eyeglass element comprises at least one portion through which the human operator is to view, in relation to the viewfinder, at least one region visible at least in part to the human operator;

the at least one eyeglass element comprises two controllably variably transparent film layers that are adjacent each other, one of the two layers being dimensioned so as to correspond to an entirety of an area of the at least one eyeglass element, the other of the two layers having at least one certain region that is dimensioned and located in the other of the two layers so as to correspond to the at least one active field of view;

optical transmissivity and/or opacity of the at least one eyeglass element being controllable. at least in part. so as to be capable of providing. in response at least in part to the image capture actuation, at least one visually non-transparent portion of the at least one eyeglass element to indicate, at least in part, that image capture has occurred.

12. The computer-readable memory of claim 11, wherein:

the viewfinder is to indicate, at least in part, the at least one active field of view by providing to the human operator, at least one visual boundary delimiting at least one capture region of the at least one camera within, at least in part, the at least one region visible, at least in part, to the human operator; and in response, at least in part, to the image capture actuation, the at least one eyeglass element is to provide, at least in part, the human operator at least one other visual indication, the at least one other visual indication being to indicate, at least in part, that image capture by the at least one camera of at least one capture region has occurred.

13. The computer-readable memory of claim 11, wherein:

the at least one eyeglass element comprises at least one of:
- at least one controllably, variably transparent electrochromic panel element; and
- at least one controllable liquid crystal display (LCD) panel element;

the at least one eyeglass element is attached, at least in part, to an eyeglass frame wearable, at least in part, by the human operator;

the frame comprises a microcontroller to control, at least in part, the at least one camera and the at least one eyeglass element, based at least in part upon input from the human operator.

14. The computer-readable memory of claim 11, wherein:

the at least one camera is controllably optically zoomable and has a selectably variable focal length;

the at least one eyeglass element comprises at least one of:
- controllable electrochromic elements; and
- controllable liquid crystal display (LCD) elements;

at least one of the eletrochromic elements and the LCD elements is to be dynamically controlled so as to permit the at least one visual indication to correspond to a currently selected focal length of the at least one camera.

15. The computer-readable memory of claim 11, wherein:

the at least one eyeglass element satisfies at least one of the following subparagraphs (a) and (b):

(a) the at least one eyeglass element comprises at least one matrix of controllably variably transparent elements whose respective transparencies are to be controlled so as to provide regions that are to provide, at least in part, both the at least one visual indication and at least one other visual indication to indicate, at least in part, that image capture by the at least one camera has occurred; and (b) the at least one matrix is comprised, at least in part, in at least one layer of at least one eyeglass element.

16. A system wearable, at least in part, by a human operator, the system comprising:

at least one camera wearable, at least in part, by the human operator, the at least one camera having, when enabled, at least one active field of view that is to be captured by the at least one camera in response, at least in part, to image capture actuation by the human operator;

a viewfinder wearable, at least in part, on a head of the human operator, the viewfinder to provide to the human operator, prior to the image capture actuation, at least one visual indication of the at least one active field of view of the at least one camera, the at least one visual indication to be displayed in at least one central field of vision of the human operator;

wherein the at least one camera and the viewfinder are capable of being controlled, at least in part, based, at least in part, upon (1) detection, based at least in part upon comparisons, at least in part, of at least one previously captured stored image with at least one current video data stream, of presence of one or more user-programmable types of currently sensed but previously uncaptured images, and (2) one or more of the following:

(a) one or more user-programmed physical gestures of the human operator;

(b) one or more user-programmed facial gestures of the human operator;

(c) one or more user-programmed biofeedback signals initiated, at least in part, by the human operator;

also wherein:

the comparisons are to be carried out, at least in part, both on an on-going basis and using mathematical decomposition/hashing;

the system comprises at least one eyeglass element to be worn on the head of the human operator:

the at least one camera also is to be worn on the head of the human operator:

when the at least one camera is enabled, the at least one eyeglass element comprises at least one portion through which the human operator is to view, in relation to the viewfinder, at least one region visible at least in part to the human operator:

the at least one eyeglass element comprises two controllably variably transparent film layers that are adjacent each other, one of the two layers being dimensioned so as to correspond to an entirety of an area of the at least one eyeglass element, the other of the two layers having at least one certain region that is dimensioned and located in the other of the two layers so as to correspond to the at least one active field of view:

optical transmissivity and/or opacity of the at least one eyeglass element being controllable, at least in part, so as to be capable of providing. in response at least in part to the image capture actuation, at least one visually non-transparent portion of the at least one eyeglass element to indicate, at least in part, that image capture has occurred.

17. The system of claim 16, wherein:

the viewfinder is to indicate, at least in part, the at least one active field of view by providing to the human operator, at least one visual boundary delimiting at least one capture region of the at least one camera within, at least in part, the at least one region visible, at least in part, to the human operator; and in response, at least in part, to the image capture actuation, the at least one eyeglass element is to provide, at least in part, the human operator at least one other visual indication, the at least one other visual indication being to indicate, at least in part, that image capture by the at least one camera of the at least one capture region has occurred.

18. The system of claim 16, wherein:

the at least one eyeglass element comprises at least one of:

at least one controllably, variably transparent electrochromic panel element; and at least one controllable liquid crystal display (LCD) panel element;

the at least one eyeglass element is attached, at least in part, to an eyeglass frame wearable, at least in part, by the human operator;

the frame comprises a microcontroller to control, at least in part, the at least one camera and the at least one eyeglass element, based at least in part upon input from the human operator.

* * * * *